United States Patent
Whitfill et al.

(10) Patent No.: US 10,066,143 B2
(45) Date of Patent: Sep. 4, 2018

(54) RESILIENT CARBON-BASED MATERIALS AS LOST CIRCULATION MATERIALS AND RELATED METHODS

(71) Applicant: Halliburton Energy Services, Inc., Houston, TX (US)

(72) Inventors: Donald L. Whitfill, Kingwood, TX (US); Jonathan Paul Walker, Cypress, TX (US); Sharath Savari, Stafford, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/525,941

(22) PCT Filed: Dec. 11, 2014

(86) PCT No.: PCT/US2014/069711
§ 371 (c)(1),
(2) Date: May 10, 2017

(87) PCT Pub. No.: WO2016/093832
PCT Pub. Date: Jun. 16, 2016

(65) Prior Publication Data
US 2017/0321102 A1 Nov. 9, 2017

(51) Int. Cl.
*C09K 8/467* (2006.01)
*C09K 8/03* (2006.01)
(Continued)

(52) U.S. Cl.
CPC ............. *C09K 8/032* (2013.01); *C09K 8/426* (2013.01); *C09K 8/5045* (2013.01); *C09K 8/516* (2013.01); *E21B 21/01* (2013.01); *E21B 43/34* (2013.01)

(58) Field of Classification Search
None
See application file for complete search history.

(56) References Cited

U.S. PATENT DOCUMENTS

| 5,826,669 | A | 10/1998 | Zaleski et al. |
| 7,284,611 | B2 | 10/2007 | Reddy et al. |
| (Continued) | | | |

FOREIGN PATENT DOCUMENTS

WO 2014143554 A1 9/2014

OTHER PUBLICATIONS

International Search Report and Written Opinion dated Aug. 18, 2015 in International Application No. PCT/US2014/069711.
(Continued)

*Primary Examiner* — Angela M DiTrani
*Assistant Examiner* — Andrew Sue-Ako
(74) *Attorney, Agent, or Firm* — McDermott Will & Emery LLP

(57) ABSTRACT

Highly resilient carbon-based materials having a resiliency greater than about 120% at 10,000 psi may be useful as lost circulation materials (LCMs) for wellbore strengthening and lost circulation mitigation in downhole operations in subterranean formations with depleted zones. For example, a downhole method may include drilling at least a portion of a wellbore penetrating a subterranean formation with at least one depleted zone having a plurality of fractures extending from the wellbore into the at least one depleted zone; circulating a treatment fluid through the wellbore, the treatment fluid comprising a base fluid and a resilient carbon-based material having a resiliency greater than about 120% at 10,000 psi; contacting the at least one depleted zone with the resilient carbon-based material; and plugging at least some of the plurality of fractures in the at least one depleted zone with the resilient carbon-based material.

16 Claims, 5 Drawing Sheets

(51) Int. Cl.
*C09K 8/42* (2006.01)
*C09K 8/504* (2006.01)
*C09K 8/516* (2006.01)
*E21B 21/01* (2006.01)
*E21B 43/34* (2006.01)

(56) References Cited

U.S. PATENT DOCUMENTS

| | | |
|---|---|---|
| 7,402,338 B2 | 7/2008 | Weintritt et al. |
| 8,043,997 B2 | 10/2011 | Whitfill et al. |
| 8,999,898 B2 * | 4/2015 | Zhou ............... C09K 8/035 507/100 |
| 2009/0221452 A1 * | 9/2009 | Whitfill ............. C09K 8/03 507/104 |
| 2012/0108472 A1 * | 5/2012 | Wu ................. C04B 18/022 507/112 |
| 2013/0112414 A1 | 5/2013 | Kumar et al. |
| 2014/0038857 A1 | 2/2014 | Miller et al. |

OTHER PUBLICATIONS

Superior Graphite, "Resilient Graphitic Carbons," Retrieved from URL: http://www.superiorgraphite.com/pdf/RGC%20Brochure.pdf, Retrieved on May 9, 2017 (5 pages).

* cited by examiner

RESILIENT CARBON-BASED MATERIALS AS LOST CIRCULATION MATERIALS AND RELATED METHODS

BACKGROUND

The present invention relates to lost circulation materials (LCMs) for wellbore strengthening and lost circulation mitigation during downhole operations.

Lost circulation is one of the larger contributors to nonproductive time in a wellbore drilling operation. Lost circulation arises from drilling fluid leaking into the formation via undesired flow paths (e.g., permeable sections, natural fractures, and induced fractures). Lost circulation treatments or pills may be used to remediate the wellbore by plugging the fractures before drilling can resume.

Generally, drilling is performed with an overbalance pressure such that the wellbore pressure is maintained within the mud weight window (i.e., the area between the pore pressure and the fracture pressure), FIG. 1. The term "overbalance pressure," as used herein, refers to the amount of pressure in the wellbore that exceeds the pore pressure. The term "pore pressure," as used herein, refers to the pressure of fluids in the formation. Overbalance pressure is needed to prevent reservoir fluids from entering the wellbore. The term "fracture pressure," as used herein, refers to the pressure threshold where pressures exerted in excess of the threshold from the wellbore onto the formation that will cause one or more fractures in the subterranean formation. Wider mud weight windows allow for drilling with a reduced risk of lost circulation.

In traditional subterranean formations, the mud weight window may be wide, FIG. 1. However, in formations having problematic zones (e.g., depleted zones, high-permeability zones, highly tectonic areas with high in-situ stresses, or pressurized shale zones below salt layers), the mud weight window may be narrower and more variable, FIG. 2. When the overbalance pressure exceeds the fracture pressure, a fracture may be induced and lost circulation may occur. By incorporating an LCM in the fracture to temporarily plug the fracture, the compressive tangential stress in the near-wellbore region of the subterranean formation increase, which translates to an increase in the fracture pressure, thereby widening the mud weight window, FIG. 3.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
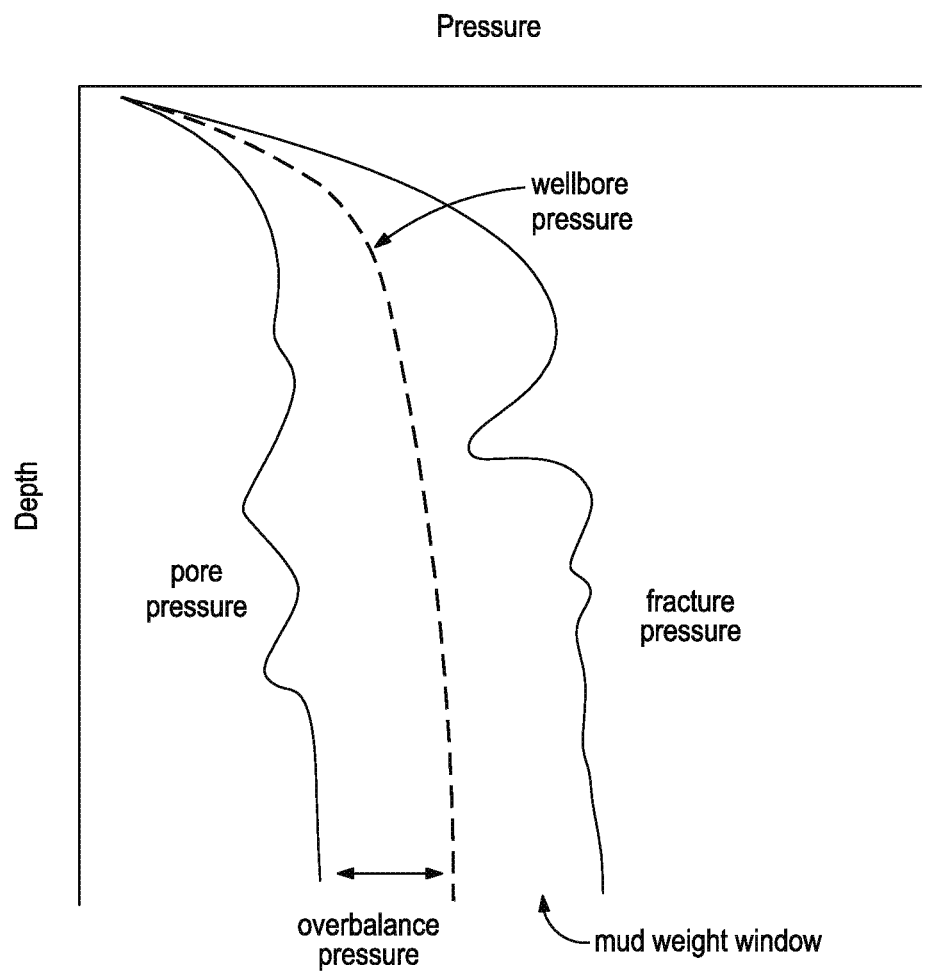
FIG. 1 illustrates the mud weight window for a traditional wellbore.
Figure 2:
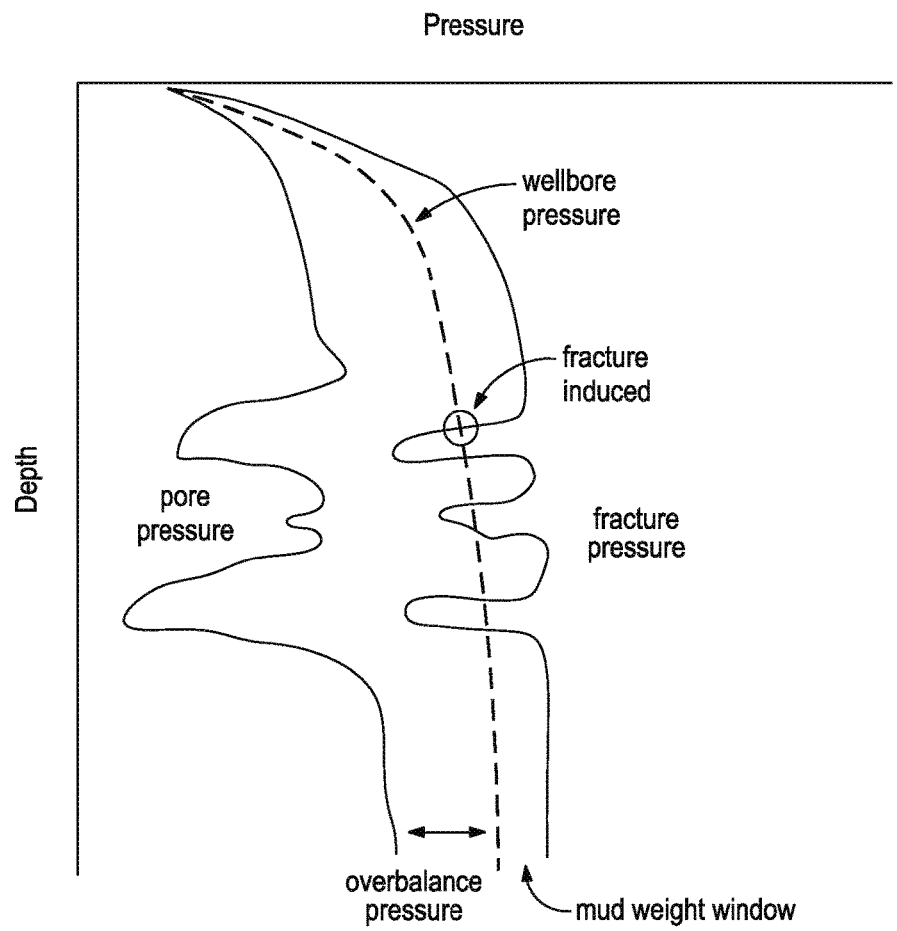
FIG. 2 illustrates the mud weight window for a problematic wellbore.
Figure 3:
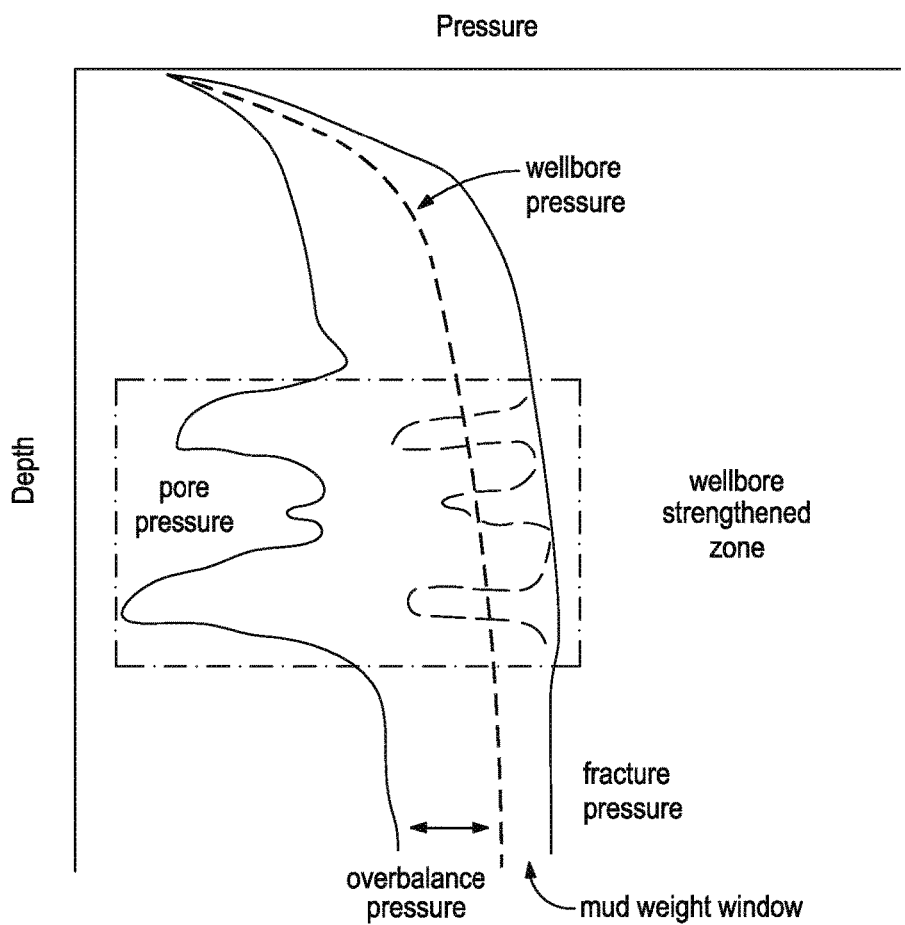
FIG. 3 illustrates the mud weight window for a strengthened wellbore.

The present invention relates to LCMs, specifically, highly resilient carbon-based materials, for wellbore strengthening and lost circulation mitigation in downhole operations in subterranean formations with depleted zones.

Depleted zones often arise from a subterranean formation having sand and shale lithologies that has been drilled and produced in multiple locations. Often sand lithologies are layered between shale lithologies. The sand lithologies are generally very porous and readily produce hydrocarbons as compared to the shale lithologies that are fine grain rocks under very high closer pressure, which yields a generally nonporous lithology. Therefore, the hydrocarbons in the sand lithology move more readily and can be produced from longer distances. Over time, as the hydrocarbons are produced from various wells drilled into the formation, the sand lithology becomes depleted of hydrocarbons, which causes the pore pressure and the fracture pressure in the sand lithology across the formation to decrease. However, the shale lithology produces only very close to individual wellbores because of its nonporous nature. Accordingly, as more wells are drilled into the formation, the mud weight window becomes very complex. For example, a heavy mud may be used to prevent shale collapse due to the high pore pressure during drilling, but the mud is too heavy for the sand and causes fractures, which leads to lost circulation. In such instances, fractures in the depleted sand often tend to be larger than in other lithologies because of the pore pressure differential between the depleted sand and the shale and the higher permeability of the sand.

In addition to the pressure and fracture size issues encountered in drilling depleted sand zones proximal to shale zones in a formation, drilling operations include a variety of pressure changes when tripping pipe and starting/stopping drilling fluid circulation. This is often known as swab (lower) and surge (higher) pressure changes. The pressure changes may not stay within the mud weight window. Surge pressures may initiate fractures and swab pressures may initiate wellbore collapse. If LCM has been applied, or is in the drilling fluid as background, it may plug the fractures that are initiated, but the pressure changes may cause LCMs to move within the fractures and, in some instances, be removed from a plug in the fractures. If removed, lost circulation may occur again. Additionally, in the depleted sand/shale formations, the LCM in the fracture may be compacted into a solid plug because of the high closure pressure of the formation bearing on the LCM. and become lodged in the fracture In some instances, the solid plug may be difficult to remove once drilling is completed and the wellbore is prepped for production operations. Then, the production operation may have a lower efficacy because the solid plug reduces the amount of hydrocarbon that can flow from the formation and into the wellbore to be produced at the surface.

The LCM resilient carbon-based materials described herein may have an improved resiliency greater than about 120% at 10,000 psi (e.g., about 120% to about 150% at 10,000 psi). As used herein, the term resiliency refers to the calculation of a material resiliency and may be measured by a standard method developed by Superior Graphite. The method apply pressure to a sample in a metallic mold (e.g., pressures ranging from 5 to 70 MPa (700 to 10,000 psi)). The height of the sample under pressure is recorded as $h_o$, and the height of the sample after the pressure is released is referred to as $h_r$, where Resiliency (%)=$100*(h_r/h_0-1)$ where resiliency is the measure of the recovered. This high resiliency may allow the resilient carbon-based materials to be compressed by pressure and return to substantially the same size, while remaining granular, when the pressure is reduced or removed. High resiliency may be particularly useful in wellbores with depleted zones because the material may be able to withstand high fracture closure stresses without crushing to a smaller size as well as swab and surge pressure changes that may remove the LCM from the fractures.

In addition to the resiliency of the resilient carbon-based materials, the particle size of the resilient carbon-based materials may be advantageously larger than typical graphitic LCMs. The particle size of the resilient carbon-based materials described herein may be described by a $d_{10}$, a $d_{50}$, a $d_{90}$, or a combination thereof. As used herein, the term "$d_{10}$" refers to a diameter for which 10% (by volume) of the resilient carbon-based materials have a smaller diameter. As used herein, the term "$d_{50}$" refers to a diameter for which 50% (by volume) of the resilient carbon-based materials have a smaller diameter. As used herein, the term "$d_{90}$" refers to a diameter for which 90% (by volume) of the resilient carbon-based materials have a smaller diameter. For example, a resilient carbon-based material with a $d_{10}$ of about 1000 microns, a $d_{50}$ of about 2000 microns, and a $d_{90}$ of about 3200 microns includes resilient carbon-based materials with 10% by volume having a diameter less than about 1000 microns, 50% by volume having a diameter less than about 2000 microns, and 50% by volume having a diameter less than about 3200 microns. The resilient carbon-based materials described herein may have a $d_{10}$ of about 500 microns to about 1500 microns, including any subset therebetween. The resilient carbon-based materials described herein may have a $d_{50}$ of about 1000 microns to about 3000 microns, including any subset therebetween. The resilient carbon-based materials described herein may have a $d_{90}$ of about 3000 microns to about 4000 microns, including subset therebetween.

As described above, depleted zones, especially depleted sand lithologies, may include fractures extending from the wellbore with larger fracture widths (i.e., the size of the fracture at the wellbore) than encountered with lower overbalance in non-depleted sands. Therefore, in some instances where depleted zones are treated, the larger resilient carbon-based materials may be required (e.g., having a $d_{10}$ of about 500 microns or more and a $d_{50}$ of about 1000 microns or more).

In some embodiments, the resilient carbon-based materials described herein may be included in a treatment fluid (e.g., in a pill or in a drilling fluid). As used herein, a "pill" is a relatively small volume of specially prepared treatment fluid placed or circulated in the wellbore. For example, at least a portion of the wellbore may be drilled with a drilling fluid that includes the resilient carbon-based materials described herein. In another example, during drilling or another wellbore operation, a pill may be introduced into and circulated through the wellbore, the pill including the resilient carbon-based materials described herein.

After introduction of the treatment fluid, the depleted zone of the formation may be contacted by the resilient carbon-based material and at least some of the fractures therein plugged by the resilient carbon-based material.

In some instances, after plugging at least some of the fractures in the depleted zone, an additional portion of the wellbore may be drilled where during the drilling operation at least some of the fractures plugged with the resilient carbon-based material experience swab and surge pressures. As described previously, the resilient carbon-based material incorporated in the fractures may advantageously remain incorporated in the fractures and provide continued wellbore strengthening and/or lost circulation mitigation because the resilient carbon-based material has high strength and can compress and rebound in shape to maintain fracture plugging with variable pressures exerted thereon.

Treatment fluids may, in some instances, include a base fluid and the resilient carbon-based materials described herein. The resilient carbon-based materials described herein may be included at about 3 pounds per barrel ("PPB") to about 150 PPB of the treatment fluid, including any subset therebetween.

Suitable base fluids include oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, and any combination thereof), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base treatment fluid, where the amount may range from any lower limit to any upper limit and encompass any subset therebetween. Examples of suitable invert emulsions include those disclosed in U.S. Pat. Nos. 5,905,061, 5,977,031, and 6,828,279. It should be noted that for water-in-oil and oil-in-water emulsions, any mixture of the above may be used including the water phase being or including an aqueous-miscible fluid.

Treatment fluids may, in some instances, include a base fluid, the resilient carbon-based materials described herein, and optionally other LCMs. The additional LCMs may be included at about 0.25 PPB to about 150 PPB of the treatment fluid, including any subset therebetween.

When used in combination, the resilient graphite may be about 20% to about 90% of the total LCM (i.e., the sum of the resilient graphite and the other LCMs), including any subset therebetween.

The additional LCMs may have a $d_{10}$ of about 1 micron to about 750 microns, including any subset therebetween. The additional LCMs may have a $d_{50}$ of about 5 microns to about 3000 microns, including any subset therebetween.

Examples of LCMs may include, but are not limited to, sand, shale, ground marble, bauxite, ceramic materials, glass materials, metal pellets, high strength synthetic fibers, resilient graphitic carbon, cellulose flakes, wood, resins, polymer materials (crosslinked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite materials, fibers of cellulose (e.g., viscose cellulosic fibers, oil coated cellulosic fibers, and fibers derived from a plant product like paper fibers), carbon including carbon fibers, melt-processed inorganic fibers (e.g., basalt fibers, woolastonite fibers, non-amorphous metallic fibers, metal oxide fibers, mixed metal oxide fibers, ceramic fibers, and glass fibers), polymeric fibers (e.g., polypropylene fibers and poly(acrylic nitrile) fibers), metal oxide fibers, mixed metal oxide fibers, and the like, and any combination thereof. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

In some embodiments, LCMs may include a degradable material. Nonlimiting examples of suitable degradable materials may include, but are not limited to, degradable polymers (crosslinked or otherwise), dehydrated compounds, and/or mixtures of the two. As used herein, the term "degradable" and all of its grammatical variants (e.g., "degrade," "degradation," "degrading," and the like) refer to the dissolution or chemical conversion of materials into smaller components, intermediates, or end products by at least one of solubilization, hydrolytic degradation, biologically formed entities (e.g., by bacteria or enzymes), chemical reactions, electrochemical processes, thermal reactions, or reactions induced by radiation. In some instances, the degradation of the material may be sufficient for the mechanical properties of the material to reduce to a point that the material no longer maintains its integrity and, in essence, falls apart. The conditions for degradation are generally wellbore conditions, where an external stimuli may be used to initiate or effect the rate of degradation. For example, the pH of the fluid that interacts with the material may be changed by introduction of an acid or a base. The term "wellbore environment" includes both naturally occurring wellbore environments and introduced materials into the wellbore.

Specific examples of LCMs suitable for use in conjunction with the resilient carbon-based materials described herein (i.e., having a resiliency greater than about 120% at 10,000 psi) may include, but not be limited to, BARACARB® particulates (ground marble, available from Halliburton Energy Services, Inc., e.g., BARACARB® 5, BARACARB® 25, BARACARB® 150, BARACARB® 600, and BARACARB® 1200), STEELSEAL® particulates (resilient graphitic carbon having a resiliency less than about 120% at 10,000 psi, available from Halliburton Energy Services, Inc., e.g., STEELSEAL® powder, STEELSEAL® 50, STEELSEAL® 150, STEELSEAL® 400, and STEELSEAL® 1000), WALL-NUT® particulates (ground walnut shells, available from Halliburton Energy Services, Inc., e.g., WALL-NUT® M, WALL-NUT® coarse, WALL-NUT® medium, and WALL-NUT® fine), BARAPLUG® (sized salt water, available from Halliburton Energy Services, Inc., e.g., including BARAPLUG® 20, BARAPLUG® 50, and BARAPLUG® 3/300); BARAFLAKE® (calcium carbonate and polymers, available from Halliburton Energy Services, Inc.), carbon fibers derived from poly (acrylonitrile) (also referred to as PAN fibers), PANEX® fibers (carbon fibers, available from Zoltek, e.g., PANEX® 32, PANEX® 35-0.125", and PANEX® 35-0.25"), PANOX® (oxidized PAN fibers, available from SGL Group), rayon fibers including BDF™ 456 (rayon fibers, available from Halliburton Energy Services, Inc.), poly (lactide) ("PLA") fibers, alumina fibers, cellulosic fibers, BAROFIBRE® fibers (cellulosic fiber, available from Halliburton Energy Services, Inc., e.g., including BAROFIBRE® and BAROFIBRE® C), and the like, and any combination thereof.

Treatment fluids may, in some instances, include a base fluid, the resilient carbon-based materials described herein, and, optionally, other additives. The additives may be included at about 0.25 PPB to about 150 PPB of the treatment fluid, including any subset therebetween.

Examples of additives may include, but are not limited to, salts, weighting agents, inert solids, emulsifiers, dispersion aids, corrosion inhibitors, emulsion thinners, emulsion thickeners, viscosifying agents, surfactants, pH control additives, foaming agents, breakers, biocides, crosslinkers, stabilizers, chelating agents, scale inhibitors, gas, oxidizers, reducers, and any combination thereof. A person of ordinary skill in the art, with the benefit of this disclosure, will recognize when an additive should be included in a wellbore strengthening fluid and/or drilling fluid, as well as an appropriate amount of said additive to include.

Figure 4:
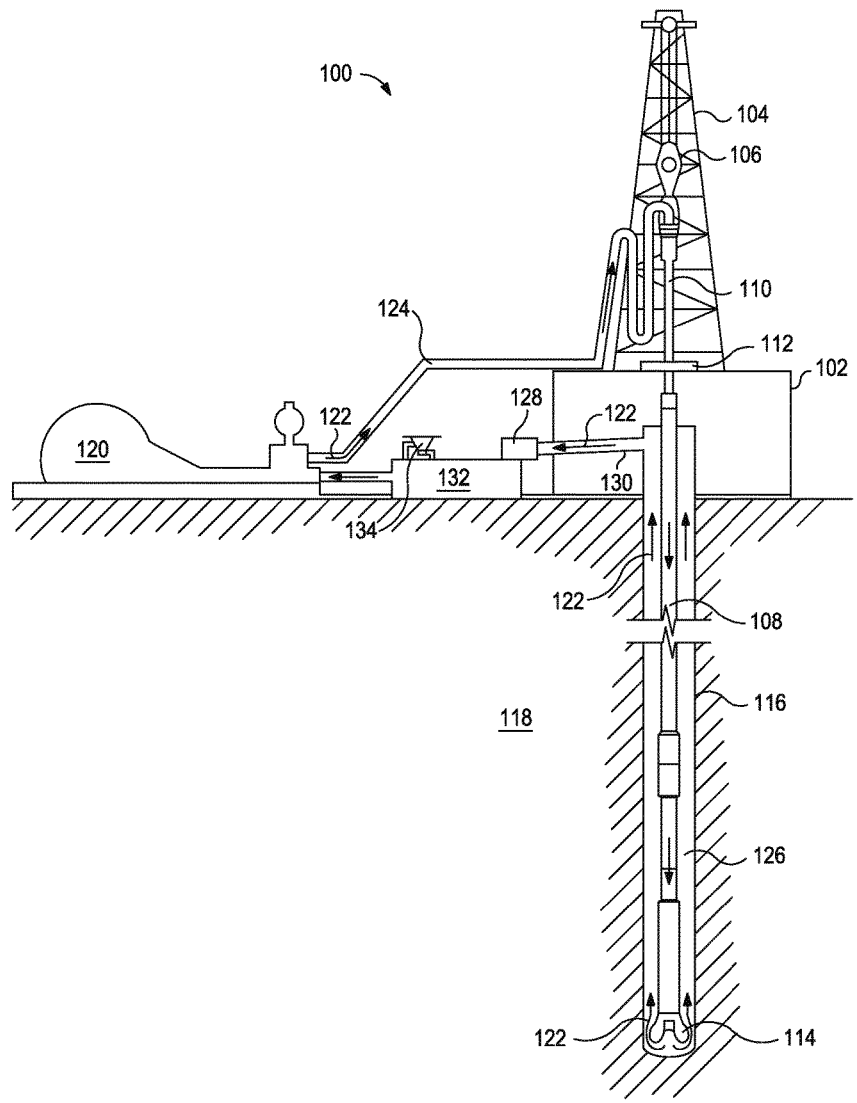
FIG. 4 provides an illustrative diagram of drilling system suitable for implementing the resilient carbon-based materials described herein.

The exemplary resilient carbon-based materials disclosed herein may directly or indirectly affect one or more components or pieces of equipment associated with the preparation, delivery, recapture, recycling, reuse, and/or disposal of the disclosed resilient carbon-based materials. For example, and with reference to FIG. 4, the disclosed resilient carbon-based materials may directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates treatment fluid 122 described herein (e.g., comprising a base fluid, resilient carbon-based materials, optionally additional LCMs, and optionally additives) through a feed pipe 124 and to the kelly 110, which conveys the treatment fluid 122 downhole through the interior of the drill string 108 and through one or more orifices in the drill bit 114. The treatment fluid 122 is then circulated back to the surface via an annulus 126 defined between the drill string 108 and the walls of the borehole 116. At the surface, the recirculated or spent treatment fluid 122 exits the annulus 126 and may be conveyed to one or more fluid processing unit(s) 128 via an interconnecting flow line 130. After passing through the fluid processing unit(s) 128, a "cleaned" treatment fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed resilient carbon-based materials may be added to the treatment fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed resilient carbon-based materials may be added to the treatment fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed resilient carbon-based materials may be stored, reconditioned, and/or regulated until added to the treatment fluid 122.

As mentioned above, the disclosed resilient carbon-based materials may directly or indirectly affect the components and equipment of the drilling assembly 100. For example, the disclosed resilient carbon-based materials may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the exemplary resilient carbon-based materials.

The disclosed resilient carbon-based materials may directly or indirectly affect the pump 120, which representatively includes any conduits, pipelines, trucks, tubulars, and/or pipes used to fluidically convey the resilient carbon-based materials downhole, any pumps, compressors, or motors (e.g., topside or downhole) used to drive the resilient carbon-based materials into motion, any valves or related joints used to regulate the pressure or flow rate of the resilient carbon-based materials, and any sensors (i.e., pressure, temperature, flow rate, etc.), gauges, and/or combinations thereof, and the like. The disclosed resilient carbon-based materials may also directly or indirectly affect the mixing hopper 134 and the retention pit 132 and their assorted variations.

The disclosed resilient carbon-based materials may also directly or indirectly affect the various downhole equipment and tools that may come into contact with the resilient carbon-based materials such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed resilient carbon-based materials may also directly or indirectly affect any downhole heat exchangers, valves and corresponding actuation devices, tool seals, packers and other wellbore isolation devices or components, and the like associated with the wellbore 116. The disclosed resilient carbon-based materials may also directly or indirectly affect the drill bit 114, which may include, but is not limited to, roller cone bits, PDC bits, natural diamond bits, any hole openers, reamers, coring bits, etc.

While not specifically illustrated herein, the disclosed resilient carbon-based materials may also directly or indirectly affect any transport or delivery equipment used to convey the resilient carbon-based materials to the drilling assembly 100 such as, for example, any transport vessels, conduits, pipelines, trucks, tubulars, and/or pipes used to fluidically move the resilient carbon-based materials from one location to another, any pumps, compressors, or motors used to drive the resilient carbon-based materials into motion, any valves or related joints used to regulate the pressure or flow rate of the resilient carbon-based materials, and any sensors (i.e., pressure and temperature), gauges, and/or combinations thereof, and the like.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Embodiments disclosed herein include:

A. a method that includes drilling at least a portion of a wellbore penetrating a subterranean formation with at least one depleted zone having a plurality of fractures extending from the wellbore into the at least one depleted zone; circulating a treatment fluid through the wellbore, the treatment fluid comprising a base fluid and a resilient carbon-based material having a resiliency greater than about 120% at 10,000 psi; contacting the at least one depleted zone with the resilient carbon-based material; and plugging at least some of the plurality of fractures in the at least one depleted zone with the resilient carbon-based material;

B. a method that includes providing a subterranean formation including a layered lithology of sand and shale, wherein the sand is hydrocarbon depleted; drilling at least a portion of a wellbore into subterranean formation extending through the sand and shale; circulating a treatment fluid through the wellbore, the treatment fluid comprising a base fluid and a resilient carbon-based material having a resiliency greater than about 120% at 10,000 psi, a $d_{10}$ of about 500 microns to about 1500 microns, a $d_{50}$ of about 1000 microns to about 3000 microns, and a $d_{90}$ of about 3000 microns to about 4000 microns; contacting the sand with the resilient carbon-based material; and plugging at least one fracture extending from the wellbore into the sand with the resilient carbon-based material; and C. a system that includes a drilling assembly with a drill string extending therefrom and into a wellbore in a subterranean formation with at least one depleted zone having a plurality of fractures extending from the wellbore into the at least one depleted zone; and a pump fluidly coupled to the drill string, the drill string containing a treatment fluid that comprises a base fluid and a resilient carbon-based material having a resiliency greater than about 120% at 10,000 psi.

Each of embodiments A, B, and C may have one or more of the following additional elements in any combination (unless already provided for in the embodiment): Element 1: wherein the resilient carbon-based material has a $d_{10}$ of about 500 to about 1500; Element 2: wherein the resilient carbon-based material has a $d_{50}$ of about 1000 to about 3000; Element 3: wherein the resilient carbon-based material has a $d_{90}$ of about 3000 to about 4000; Element 4: wherein the resilient carbon-based material is at about 3 pounds per barrel to about 150 pounds per barrel of the treatment fluid; Element 5: wherein the treatment fluid further comprises a lost circulation material that is not the resilient carbon-based material; Element 6: Element 5 wherein the lost circulation material is at about 0.25 pounds per barrel to about 150 pounds per barrel of the treatment fluid; Element 7: Element 5 wherein a total of the lost circulation material and the resilient carbon-based material includes the resilient carbon-based material at about 20% to about 99% by volume to the total; Element 8: Element 5 wherein the lost circulation material has a $d_{10}$ of about 1 micron to about 750 microns; and Element 9: Element 5 wherein the lost circulation material has a $d_{50}$ of about 5 microns to about 3000 microns.

Each of embodiments A and B may have one or more of the following additional elements in any combination: Element 10: the method further including subjecting the resilient carbon-based material plugging the at least some of the plurality of fractures in the at least one depleted zone to swab and surge pressure changes; Element 11: the method further including drilling an additional portion of the wellbore after plugging the at least some of the plurality of fractures in the at least one depleted zone with the resilient carbon-based material; and Element 12: the method further including removing at least some of the resilient carbon-based material from the at least some of the plurality of fractures; and producing hydrocarbon from the subterranean formation.

By way of non-limiting example, exemplary combinations applicable to Embodiments A, B, and C (unless already provided for in the embodiment) include: Element 1 in combination with Element 2 and optionally Element 4; Element 1 in combination with Element 3 and optionally Element 4; Element 3 in combination with Element 2 and optionally Element 4; Elements 1-3 in combination with Element 4; Elements 1-2 in combination with Element 5 and optionally at least one of Elements 6-9; Elements 2-3 in combination with Element 5 and optionally at least one of Elements 6-9; Elements 1 and 3 in combination with Element 5 and optionally at least one of Elements 6-9; and any combination thereof.

By way of additional non-limiting example, exemplary combinations applicable to Embodiments A and B (unless already provided for in the embodiment) include: Element 10 in combination with at least one of Elements 1-9 (including the foregoing combinations); Element 11 in combination with at least one of Elements 1-9 (including the foregoing combinations); Element 12 in combination with at least one of Elements 1-9 (including the foregoing combinations); Element 10 in combination with Element 11 and optionally in combination with at least one of Elements 1-9 (including the foregoing combinations); Element 10 in combination with Element 12 and optionally in combination with at least one of Elements 1-9 (including the foregoing combinations); Element 11 in combination with Element 12 and optionally in combination with at least one of Elements 1-9 (including the foregoing combinations); and Elements 10-12 in combination and optionally in further combination with at least one of Elements 1-9 (including the foregoing combinations).

To facilitate a better understanding of the embodiments of the present invention, the following examples of preferred or representative embodiments are given. In no way should the following examples be read to limit, or to define, the scope of the invention.

EXAMPLES

A resilient carbon-based material described herein (CM1) and a resilient graphitic carbon traditionally used as a loss circulation material (CM2) were analyzed for particle size and resiliency (Table 1).

TABLE 1

| Sample | Resiliency at 10,000 psi | $d_{10}$ | $d_{50}$ |
|---|---|---|---|
| CM1 | ~145% | ~1235 microns | ~2113 microns |
| CM2 | ~113% | ~630 microns | ~1105 microns |

Each of the two samples were then mixed at a concentration of 25 wt % with other loss circulation materials (LCM) (12 wt % BARACARB® 150, 25 wt % BARACARB® 600, 12 wt % BARACARB® 1200, 6 wt % STEELSEAL® 100, 6 wt % STEELSEAL® 400, and 14 wt % STEELSEAL® 1000) to form composite loss circulation materials. The resiliency and pore plugging ability (PPA) (procedure described below) of each were measured (Table 2).

TABLE 2

| Sample | Resiliency at 10,000 psi | PPA with 2500 micron slot | PPA with 3000 micron slot |
|---|---|---|---|
| LCM composite with CM1 | ~82% | ~19 mL | ~14 mL |
| LCM composite with CM2 | ~62% | no plugging | no plugging |

PPA Test. A Particle Plugging Apparatus 200, illustrated in FIG. 5A, was used and included a 500-mL volume cell 202 having a movable piston 204 at the bottom and an assembly 206 for sealing a tapered slot 212 in the top while testing a fluid 214 contained in the cell 202. The test fluid 214 is loaded into the cell 202. The cell 202 is positioned with pressure applied from the bottom of the cell 202 and the filtrate 216 collected from the top. This configuration may help prevent other components of the test fluid 202 that settle during the static test from contributing to the performance of the LCMs therein. Pressure 208, applied by a two-stage hydraulic pump (not shown) or using a nitrogen pressure line, is transferred to the test fluid 214 through the piston 204 (illustrated as a floating piston) in the cell 202, so as to maintain a differential pressure of about 500 psi. The amount of filtrate collected 216 that passes through the tapered slot 212 before the tapered slot 212 is plugged is recorded as the pore plugging ability of the test fluid.

Figure 5A:
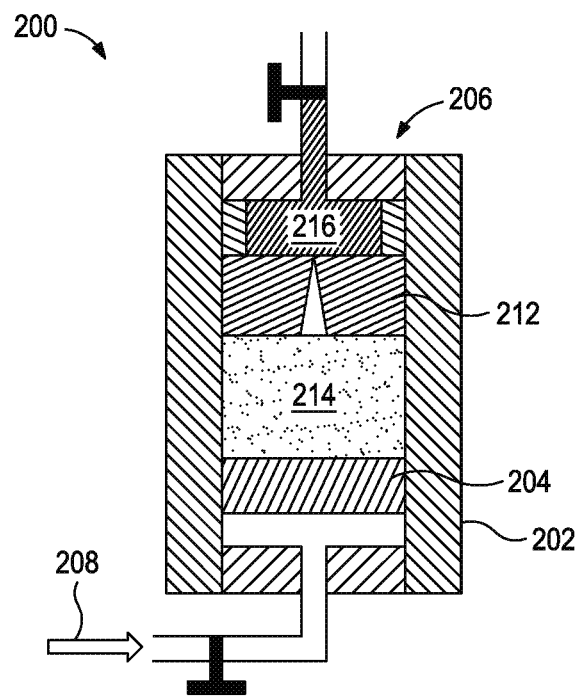
FIG. 5A provides an illustrative diagram of a pore plugging apparatus.
Figure 5B:
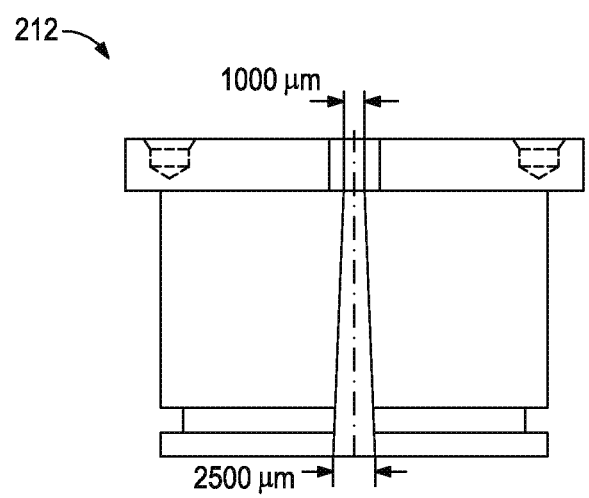
FIG. 5B provides an illustrative diagram of a tapered slot for use in conjunction with a pore plugging apparatus.

An exemplary tapered slot 212 is illustrated in FIG. 5B where the size of the slot is the size of the width of the large end of the taper that abuts the fluid in the Particle Plugging Apparatus 200 of FIG. 5A.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   drilling at least a portion of a wellbore penetrating a subterranean formation with at least one depleted zone having a plurality of fractures extending from the wellbore into the at least one depleted zone;
   circulating a treatment fluid through the wellbore, the treatment fluid comprising a base fluid and a resilient carbon-based material having a resiliency of about 120% to about 150% at 10,000 psi, wherein the resilient carbon-based material has a $d_{10}$ of about 500 μm to about 1500 μm and a $d_{50}$ of about 1000 μm to about 3000 μm;
   contacting the at least one depleted zone with the resilient carbon-based material; and
   plugging at least some of the plurality of fractures in the at least one depleted zone with the resilient carbon-based material.

2. The method of claim 1, wherein the resilient carbon-based material has a $d_{90}$ of about 3000 μm to about 4000 μm.

3. The method of claim 1, wherein the resilient carbon-based material is at about 3 pounds per barrel to about 150 pounds per barrel of the treatment fluid.

4. The method of claim 1, wherein the treatment fluid further comprises a lost circulation material that is not the resilient carbon-based material.

5. The method of claim 4, wherein the lost circulation material is at about 0.25 pounds per barrel to about 150 pounds per barrel of the treatment fluid.

6. The method of claim 4, wherein a total of the lost circulation material and the resilient carbon-based material includes the resilient carbon-based material at about 20% to about 99% by volume to the total.

7. The method of claim 4, wherein the lost circulation material has a $d_{10}$ of about 1 micron to about 750 microns.

8. The method of claim 4, wherein the lost circulation material has a $d_{50}$ of about 5 microns to about 3000 microns.

9. The method of claim 1 further comprising: subjecting the resilient carbon-based material plugging the at least some of the plurality of fractures in the at least one depleted zone to swab and surge pressure changes.

10. The method of claim 1 further comprising: drilling an additional portion of the wellbore after plugging the at least some of the plurality of fractures in the at least one depleted zone with the resilient carbon-based material.

11. A method comprising:
    providing a subterranean formation including a layered lithology of sand and shale, wherein the sand is hydrocarbon depleted;
    drilling at least a portion of a wellbore into subterranean formation extending through the sand and shale;
    circulating a treatment fluid through the wellbore, the treatment fluid comprising a base fluid and a resilient carbon-based material having a resiliency of about 120% to about 150% at 10,000 psi, a $d_{10}$ of about 500 microns to about 1500 microns, a $d_{50}$ of about 1000 microns to about 3000 microns, and a $d_{90}$ of about 3000 microns to about 4000 microns;
    contacting the sand with the resilient carbon-based material; and
    plugging at least one fracture extending from the wellbore into the sand with the resilient carbon-based material.

12. The method of claim 11, wherein the resilient carbon-based material is at about 3 pounds per barrel to about 150 pounds per barrel of the treatment fluid.

13. The method of claim 11, wherein the treatment fluid further comprises a lost circulation material that is not the resilient carbon-based material.

14. The method of claim 13, wherein the lost circulation material is at about 0.25 pounds per barrel to about 150 pounds per barrel of the treatment fluid.

15. The method of claim 13, wherein a total of the lost circulation material and the resilient carbon-based material includes the resilient carbon-based material at about 20% to about 99% by volume to the total.

16. A system comprising:
    a drilling assembly with a drill string extending therefrom and into a wellbore in a subterranean formation with at least one depleted zone having a plurality of fractures extending from the wellbore into the at least one depleted zone; and
    a pump fluidly coupled to the drill string, the drill string containing a treatment fluid that comprises a base fluid and a resilient carbon-based material having a resiliency of about 120% to about 150% at 10,000 psi a $d_{10}$ of about 500 microns to about 1500 microns, a $d_{50}$ of about 1000 microns to about 3000 microns, and a $d_{90}$ of about 3000 microns to about 4000 microns.

\* \* \* \* \*